L. H. VAN BRIGGLE.
CARBURETER.
APPLICATION FILED JUNE 21, 1919.
Reissued Dec. 16, 1919.
14,771.
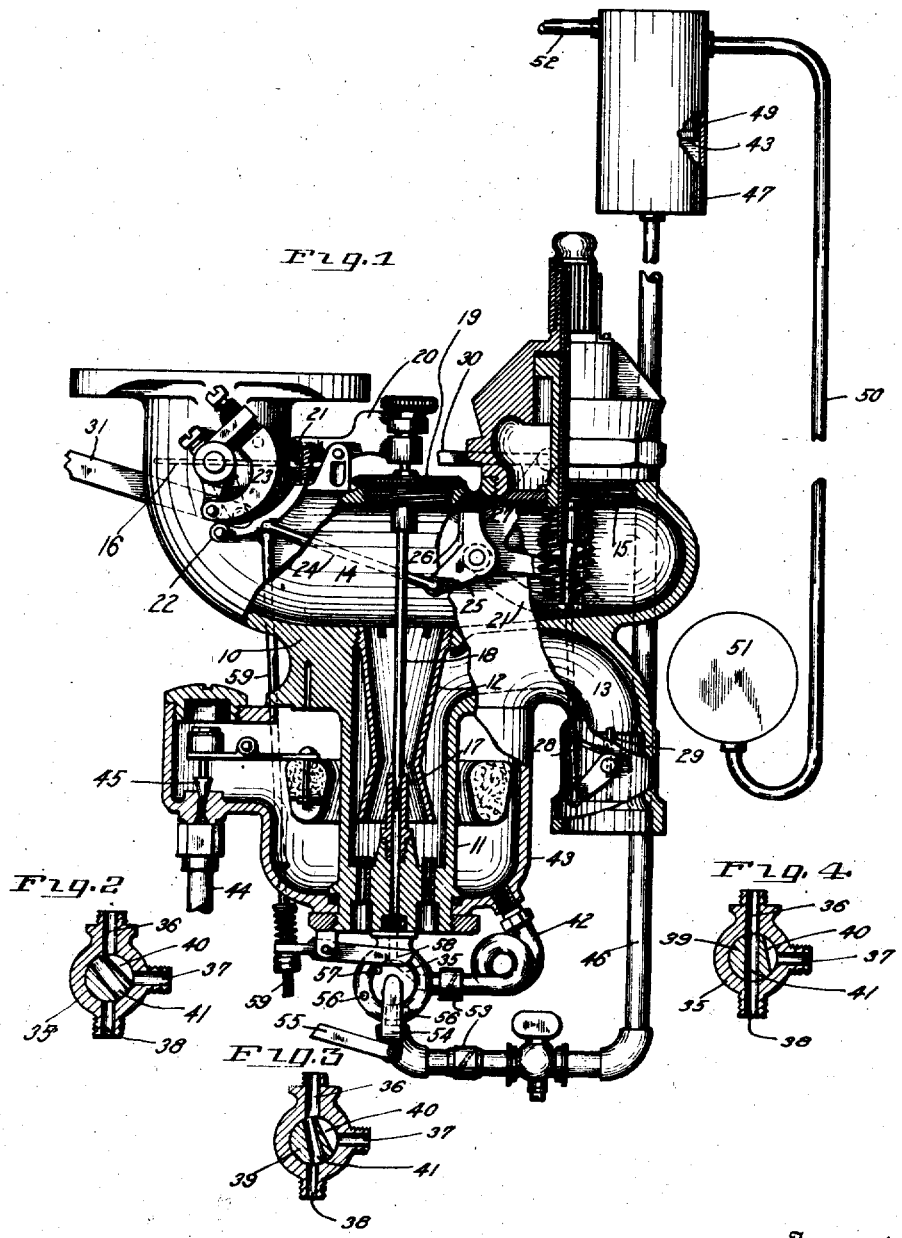
Witness
Inventor
LILBURN HOWARD VAN BRIGGLE.
By
Attorneys

UNITED STATES PATENT OFFICE.

LILBURN HOWARD VAN BRIGGLE, OF INDIANAPOLIS, INDIANA.

CARBURETER.

14,771. Specification of Reissued Letters Patent. Reissued Dec. 16, 1919.

Original No. 1,304,418, dated May 20, 1919, Serial No. 99,139, filed May 22, 1916. Application for reissue filed June 21, 1919. Serial No. 305,933.

*To all whom it may concern:*

Be it known that I, LILBURN HOWARD VAN BRIGGLE, a citizen of the United States, residing at Indianapolis, in the county of Marion and the State of Indiana, have invented a new and useful Carbureter, of which the following is a specification.

It is the object of my invention to provide a carbureting system which is suitable for both high and low grade fuels, such as gasolene and kerosene.

I have discovered that an ordinary gasolene carbureter, in which the fuel is kept in the fuel nozzle at about the discharge level thereof and lifted therefrom by the engine suction, may be used effectively for kerosene if the kerosene is supplied to the fuel nozzle under a static head, so that it is discharged therefrom as a jet into the carbureting passage of the carbureter by the pressure of such static head, especially if at the same time the fuel nozzle is opened somewhat so as to provide a larger outlet for the kerosene. This is probably due to the fact that kerosene flows with greater difficulty from a small hole than does gasolene, so that while under certain conditions the engine suction causes sufficient flow of gasolene it does not cause a sufficient flow of kerosene unless the flow of kerosene is aided. For obtaining the best results, the kerosene should be supplied under a substantially constant static head, which can conveniently be done by supplying the kerosene to the fuel nozzle by a standard vacuum fuel feed system.

The accompanying drawing illustrates my invention.

Figure 1 is a partial vertical section and partial elevation through a carbureter embodying my invention; showing the alternative fuel supply to the fuel nozzle; and Figs. 2, 3, and 4 are sectional views through the valve controlling the fuel supply for the fuel nozzle, showing such valve in positions to supply gasolene, a mixture of gasolene and kerosene, and kerosene respectively.

The carbureter proper is of the type shown in my prior Patent, No. 1,273,554 of July 23, 1918. This carbureter has a main body 10 with a central depending tube 11 in which is hung a Venturi tube 12 supported at its top at the upper end of the tube 11 and receiving the supply of primary air through a passage 13 opening into the tube 11 near the upper end thereof so that the primary air passes down along the tube 11 and around the lower end of the Venturi tube 12 into and upward through such Venturi tube. The Venturi tube 12 discharges at the top into a cross passage 14, which at the right is provided with an automatic secondary air inlet valve 15 and at the left with a discharge outlet having a throttle valve 16. A fuel nozzle 17 is located within the Venturi tube 12, and its controlling needle 18 projects up through the cross passage 14 and a removable cap 19 to a lever 20, which is spring-pressed by a spring 21 in a direction to close the fuel outlet of the fuel nozzle. The lever 20 is provided with a roller 22 which is moved by an adjustable cam 23 on the shaft of the throttle 16, so as to raise the needle 18 and open the fuel nozzle when the throttle 16 is opened. The lever 20 is also connected by a link 24 to a bell-crank 25 having a finger 26 which is engaged by a choker lever 27 when such choker lever is moved in a counter-clockwise direction (Fig. 1) so that the stop arm 27′ rigid therewith is raised to obstruct the opening of the secondary air valve 15, the lever 27 being connected (at either of two points) by a link 28 to a choker valve 29 in the primary air passage 13 so as to shut off the primary air when the choker lever 27 is moved to obstruct the opening of the secondary air valve. The choker lever 27 is operated by a suitable operating rod 30, and the throttle 16 by a suitable operating rod 31, which may lead to any convenient control point, such as the dash of the automobile.

The fuel nozzle 17 is supplied through a valve 35, conveniently located just below the carbureter body. This valve has an outlet port 36 leading to the fuel nozzle 17, two inlet ports 37 and 38 leading respectively from gasolene and kerosene supply sources (or other high and low grade fuel supply sources) respectively, and a rotatable valve member 39 having two passages 40 and 41 for connecting the ports 37 and 38 respectively to the port 36. This valve construction is not essential, so long as the valve can interconnect the outlet port to either supply port, and preferably to both supply ports simultaneously when desired, at will. The port 37 is connected by a pipe 42 to the ordinary gasolene bowl 43 of the carbureter, which is supplied with gasolene from any suitable source through a supply pipe 44 and has the gasolene level therein maintained substantially constant by a float valve 45 at substantially the level of the top of the fuel nozzle 17. The port 38 is connected by a pipe 46 to a kerosene tank 47 materially higher than the nozzle 17, which kerosene tank contains kerosene at a substantially constant level, between the minimum limit illustrated by the full line 48 and the maximum limit indicated by the dotted line 49, as by being the intermediate supply tank of a standard vacuum fuel feed system, which receives fuel through a pipe 50 from a main supply tank 51 lower than the tank 47 and is connected by a suction pipe 52 to a suitable source of suction, such as the intake manifold of the associated internal combustion engine. A check valve 53 is provided in each pipe 42 and 46, so as to prevent possibility of back flow of fuel through such pipe. The valve member 39 is operated by a lever 54, which may be connected by a suitable operating rod 55 to any convenient control point, such as the dash of the automobile. The movement of the lever 54 is limited by two pins 56 which are engaged by the lever when the valve member 39 is in the position shown in Figs. 2 and 4 respectively. The lever 54 is in its intermediate position when the valve member 39 is in the position shown in Fig. 3, in which position a mixture of kerosene and gasolene is supplied to the fuel nozzle. The valve member 39 carries a pin 57 which engages and raises the right hand end of a lever 58 when the valve member 39 is moved to the position shown in Fig. 4, this lever 58 being connected by an adjustable link 59 to the lever 20 so as to turn the lever 20 to raise the needle 18 and open the fuel nozzle when kerosene is supplied.

In operation, the fuel level in the gasolene bowl 43 is maintained by the float valve 45, and the fuel level in the kerosene tank 47 by the vacuum feed apparatus within such tank. In starting the engine, the valve member 39 is placed in the position shown in Fig. 2, so as to supply gasolene, which is supplied to the nozzle 17 under no static head because the gasolene level in the bowl 43 is substantially the level of the outlet of the nozzle 17. Thus the gasolene is lifted from the nozzle 17 by the suction of the engine. The throttle valve 16 and the choker lever 27 may be operated in the usual manner, the operation of either one controlling the position of the needle valve 18. When the engine has been started the valve member 39 may be turned through the position shown in Fig. 3, where mixed kerosene and gasolene are supplied, to the position shown in Fig. 4, where kerosene alone is supplied to the fuel nozzle. This movement of the valve member 39 causes the pin 57 to engage the lever 58 to raise the needle valve 18 to open the fuel nozzle, so that a larger amount of fuel may be supplied. Moreover, since the kerosene is under the static head of the fuel in the tank 47, it is discharged from the nozzle 17 as a jet into and in the direction of the air stream upward through the Venturi tube 12. By proper adjustment of this static head and the opening of the needle valve by the operation of the lever 58, an explosive mixture of substantially the same effectiveness as that which is produced when gasolene is supplied through the valve in the position shown in Fig. 2 may be obtained.

I claim as my invention:

1. In combination, a carbureter having a fuel nozzle, two sources of liquid fuel supply at different substantially constant-levels, and a valve for connecting said nozzle to either of said sources and to both sources simultaneously as desired.

2. In combination, a carbureter having a fuel nozzle, two sources of liquid fuel supply at different substantially constant-levels, and a valve for connecting said nozzle to either of said sources as desired.

3. In combination, a carbureter having a fuel nozzle, two sources of fuel supply at different levels, a valve for connecting said nozzle to either of said sources and to both sources simultaneously as desired, a needle controlling the effective size of said nozzle, and a connection from said valve to said needle for producing an operation of the needle when the valve is operated.

4. In combination, a carbureter having a fuel nozzle, two sources of fuel supply at different levels, a valve for connecting said nozzle to either of said sources as desired, a needle controlling the effective size of said nozzle, and a connection from said valve to said needle for producing an operation of the needle when the valve is operated.

5. In combination, a carbureter having a fuel nozzle and a throttle valve and an air inlet valve, two sources of fuel supply, a valve for connecting said nozzle to either of said sources as desired, a needle controlling the effective size of said nozzle, and connections for operating said needle by the operation of either said throttle valve, said air inlet valve, or said fuel controlling valve.

6. In combination, a carbureter having a fuel nozzle and an air inlet valve, two sources of fuel supply, a valve for connecting said nozzle to either of said sources as desired, a needle controlling the effective size of said nozzle, and connections for operating said needle by the operation of either said air inlet valve or said fuel controlling valve.

7. In combination, a carbureter having a fuel nozzle and a throttle valve, two sources of fuel supply, a valve for connecting said nozzle to either of said sources as desired, a needle controlling the effective size of said nozzle, and connections for operating said needle by the operation of either said throttle valve or said fuel controlling valve.

8. In combination, a carbureter having a fuel nozzle and a throttle valve and an automatic secondary air inlet valve and a choker member for limiting opening of said secondary air inlet valve, two sources of fuel supply, a valve for connecting said nozzle to either of said sources as desired, a needle controlling the effective size of said nozzle, and connections for operating said needle by the operation of either said throttle valve, said choker member, or said fuel controlling valve.

9. In combination, a carbureter having a fuel nozzle and an automatic secondary air inlet valve and a choker member for limiting opening of said secondary air inlet valve, two sources of fuel supply, a valve for connecting said nozzle to either of said sources as desired, a needle controlling the effective size of said nozzle, and connections for operating said needle by the operation of either said choker member or said fuel controlling valve.

10. In combination, a carbureter having a fuel nozzle, a source of high grade fuel at substantially the nozzle level, a source of lower grade fuel at a level higher than the nozzle level, and a valve for connecting said fuel nozzle to either of said sources and to both said sources simultaneously as desired.

11. In combination, a carbureter having a fuel nozzle, a source of high grade fuel at substantially the nozzle level, a source of lower grade fuel at a level higher than the nozzle level, and a valve for connecting said fuel nozzle to either of said sources as desired.

12. In combination, a carbureter having a fuel nozzle, a source of high grade fuel at substantially the nozzle level, a source of lower grade fuel at a level higher than the nozzle level, and a valve for connecting said fuel nozzle to either of said sources and to both said sources simultaneously as desired, each of said sources containing fuel at substantially constant level.

13. In combination, a carbureter having a fuel nozzle, a source of high grade fuel at substantially the nozzle level, a source of lower grade fuel at a level higher than the nozzle level, and a valve for connecting said fuel nozzle to either of said sources as desired, each of said sources containing fuel at substantially constant level.

14. In combination, a carbureter having a fuel nozzle, a fuel bowl supplied with high grade fuel and provided with means for maintaining the fuel level within it at substantially the nozzle level, a vacuum fuel feed system supplied with lower grade fuel and including an intermediate tank in which the fuel is maintained at a level substantially higher than the nozzle level, and a valve for connecting said fuel nozzle to either said fuel bowl or to said intermediate tank or to both at once as desired.

15. In combination, a carbureter having a fuel nozzle, a fuel bowl supplied with high grade fuel and provided with means for maintaining the fuel level within it at substantially the nozzle level, a vacuum fuel feed system supplied with lower grade fuel and including an intermediate tank in which the fuel is maintained at a level substantially higher than the nozzle level, and a valve for connecting said fuel nozzle to either said fuel bowl or to said intermediate tank as desired.

16. In combination, a carbureter having a fuel nozzle, a source of high grade fuel, a source of lower grade fuel, and a valve for connecting said fuel nozzle to either of said sources and to both said sources simultaneously as desired, said first source when connected to said nozzle producing no static pressure at the nozzle discharge so that suction is necessary to cause fuel discharge, and said second source when so connected producing a static pressure at the nozzle discharge so that a fuel discharge occurs independently of suction.

17. In combination, a carbureter having a fuel nozzle, a source of high grade fuel, a source of lower grade fuel, and a valve for connecting said fuel nozzle to either of said sources as desired, said first source when connected to said nozzle producing no static pressure at the nozzle discharge so that suction is necessary to cause fuel discharge, and said second source when so connected producing a static pressure at the nozzle discharge so that a fuel discharge occurs independently of suction.

18. In combination, a carbureter having a fuel nozzle, a source of high grade fuel, a source of lower grade fuel, and a valve for connecting said fuel nozzle to either of said sources and to both said sources simultaneously as desired, said second source when connected to the fuel nozzle producing a higher fuel pressure therein than does said first source when so connected.

19. In combination, a carbureter having a fuel nozzle, a source of high grade fuel, a source of lower grade fuel, and a valve for connecting said fuel nozzle to either of said sources as desired, said second source when connected to the fuel nozzle producing a higher fuel pressure therein than does said first source when so connected.

20. In combination, a carbureter having a mixture passage, two substantially constant-level sources of liquid fuel supply, connections through which said two sources of fuel supply discharge liquid fuel into said mixture passage, and means for controlling said connections so that fuel may be discharged from either of said sources or from both said sources simultaneously as desired, one of said sources being at a materially higher level than the point where it discharges into said mixture passage and than the other source.

21. In combination, a carbureter having a mixture passage, two substantially constant-level sources of liquid fuel supply, connections through which said two sources of fuel supply discharge liquid fuel into said mixture passage, and means for controlling said connections so that fuel may be discharged from either of said sources as desired, one of said sources being at a materially higher level than the point where it discharges into said mixture passage and than the other source.

22. In combination, a carbureter having a mixture passage, two substantially constant-head sources of liquid fuel supply, connections through which said two sources of fuel supply discharge liquid fuel into said mixture passage, and means for controlling said connections so that fuel may be discharged from either of said sources or from both said sources simultaneously as desired, one of said sources discharging into said mixture passage under a material head which is greater than that under which the other source discharges thereinto.

23. In combination, a carbureter having a mixture passage, two substantially constant-head sources of liquid fuel supply, connections through which said two sources of fuel supply discharge liquid fuel into said mixture passage, and means for controlling said connections so that fuel may be discharged from either of said sources as desired, one of said sources discharging into said mixture passage under a material head which is greater than that under which the other source discharges thereinto.

24. In combination, a carbureter having a mixture passage, a source of low grade fuel connected to discharge into said mixture passage under a material head, a source of high grade fuel connected to discharge into said mixture passage under a less head, and means for controlling the discharges from said two sources into said mixture passage so that either source may discharge separately or both sources may discharge simultaneously as desired.

25. In combination, a carbureter having a mixture passage, a source of low grade fuel connected to discharge into said mixture passage under a material head, a source of high grade fuel connected to discharge into said mixture passage under a less head, and means for controlling the discharges from said two sources into said mixture passage.

In witness whereof, I have hereunto set my hand at Indianapolis, Indiana, this 22d day of May, A. D. one thousand nine hundred and nineteen.

LILBURN HOWARD VAN BRIGGLE.